US009633376B2

(12) United States Patent
Fletcher et al.

(10) Patent No.: US 9,633,376 B2
(45) Date of Patent: Apr. 25, 2017

(54) SYSTEMS AND METHODS FOR PROVIDING META-SOCIAL GRAPHS

(71) Applicant: AOL Inc., Dulles, VA (US)

(72) Inventors: George F. Fletcher, Round Hill, VA (US); Lachlan A. Maxwell, Ashburn, VA (US); Travis A. Walker, South Riding, VA (US)

(73) Assignee: AOL Inc., Dulles, VA (US)

( * ) Notice: Subject to any disclaimer, the term of this patent is extended or adjusted under 35 U.S.C. 154(b) by 157 days.

(21) Appl. No.: 14/065,216

(22) Filed: Oct. 28, 2013

(65) Prior Publication Data

US 2014/0122473 A1    May 1, 2014

Related U.S. Application Data

(60) Provisional application No. 61/719,900, filed on Oct. 29, 2012, provisional application No. 61/794,730, (Continued)

(51) Int. Cl.
 *G06Q 30/02* (2012.01)
 *G06Q 10/10* (2012.01)
 (Continued)

(52) U.S. Cl.
 CPC ....... *G06Q 30/0269* (2013.01); *G06Q 10/101* (2013.01); *G06Q 50/01* (2013.01); *G09B 29/00* (2013.01)

(58) Field of Classification Search
 CPC .. G06Q 30/02; G06Q 30/0631; G06K 9/6215; G06K 9/6222; G06F 17/30864; G06F 17/3052; G06F 17/30029; G06F 17/30705; G06F 17/30722; G06F 17/30752; G06F 17/30828
 USPC .... 705/26.7, 7.29, 319, 14.52, 14.49, 14.16, 705/14.66, 14.67, 14.73, 26.62, 26.64; 707/737, 751, 784, 732, 749, 733, 734, 707/738, 748, 758, 798
 See application file for complete search history.

(56) References Cited

U.S. PATENT DOCUMENTS

| 8,768,759 B2 * | 7/2014 | Ghosh et al. ............... 705/14.1 |
| 2008/0162260 A1 * | 7/2008 | Rohan ................. G06Q 30/02 705/14.4 |

(Continued)

*Primary Examiner* — William Spieler
(74) *Attorney, Agent, or Firm* — Finnegan, Henderson, Farabow, Garrett & Dunner, L.L.P.

(57) ABSTRACT

Systems and methods are disclosed for providing a meta-social graph. In accordance with one implementation, a computerized method comprises collecting a plurality of different online identities of a first online user, each of the different online identities corresponding to a unique social network system. The method also includes collecting a plurality of communication data associated with the first user and determining bi-directional connections of the first user with other users from the collected communication data. In addition, the method may also include creating a meta-social graph from the determined bi-directional connections and the plurality of different online identities and generating a global identifier for the first user. The method also includes storing, in at least one memory device, the meta-social graph with at least one of the generated global identifier, the determined bi-directional connections, and the collected communication data.

21 Claims, 7 Drawing Sheets

Related U.S. Application Data filed on Mar. 15, 2013, provisional application No. 61/798,118, filed on Mar. 15, 2013, provisional application No. 61/798,314, filed on Mar. 15, 2013.

(51) Int. Cl.
*G06Q 50/00* (2012.01)
*G09B 29/00* (2006.01)

(56) References Cited

U.S. PATENT DOCUMENTS

2012/0158499 A1* 6/2012 Banadaki ........... G06Q 30/0254
  705/14.52
2013/0110583 A1* 5/2013 Ormont et al. .............. 705/7.29

* cited by examiner

AOL Social Graph ~ 701

| GUID1 | GUID2 | Rel |
|---|---|---|
| georgelll | andy1111 | Friend |
| andy1111 | georgelll | Friend |
| wd12 | da78 | Friend |
| wd12 | yi34 | Friend |
| da78 | wd12 | Friend |
| yi34 | wd12 | Friend |

Social Network Identities ~ 703

| Network | Network ID | GUID | Name | ... |
|---|---|---|---|---|
| AIM | georgelll | georgelll | George | |
| AIM | andy1111 | andy1111 | Andy | |
| AIM | Sue.Town | da78 | Sue | |
| Facebook | 7890 | wd12 | John | |
| Facebook | 1234 | wd12 | Dave | |
| Facebook | 2345 | yi34 | Ashley | |
| Facebook | 3456 | | Karen | |
| Twitter | 1A2B | wd12 | John | |
| Twitter | C3D4 | | Dave | |
| Twitter | E5G6 | | Judson | |
| Twitter | H8I9 | | Karen | |
| Twitter | J0K1 | da78 | Sue | |

Social Network Relationships ~ 705

| Network | NID1 | NID2 | Type |
|---|---|---|---|
| AIM | georgelll | andy1111 | uni |
| AIM | andy1111 | georgelll | uni |
| AIM | Sue.Town | georgelll | uni |
| AIM | Sue.Town | andy1111 | uni |
| Facebook | 7890 | 1234 | bi |
| Facebook | 7890 | 2345 | bi |
| Facebook | 1234 | 7890 | bi |
| Facebook | 1234 | 3456 | bi |
| Twitter | 1A2B | C3D4 | uni |
| Twitter | 1A2B | H8I9 | uni |
| Twitter | J0K1 | 1A2B | uni |
| Twitter | J0K1 | C3D4 | uni |
| Twitter | J0K1 | E5G6 | uni |

SYSTEMS AND METHODS FOR PROVIDING META-SOCIAL GRAPHS

REFERENCE TO RELATED APPLICATION(S)

This application claims the benefit of priority to U.S. Provisional Application No. 61/719,900, filed Oct. 29, 2012, U.S. Provisional Application No. 61/794,730, filed Mar. 15, 2013, U.S. Provisional Application No. 61/798,118, filed Mar. 15, 2013, and U.S. Provisional Application No. 61/798,314, filed Mar. 15, 2013. The disclosures of the above-referenced applications are expressly incorporated herein by reference in their entirety.

BACKGROUND

Technical Field

The present disclosure relates generally to social graphs and computerized systems and methods for providing a meta-social graph. More particularly, and without limitation, the present disclosure relates to systems and methods for presenting, storing, building, sharing, and managing meta-social graphs to identify and present contextual information concerning connection paths.

Background Information

Social networks allow individuals with similar interests or relationships to connect and communicate with one another. With the rise of Internet use and mobile computing, virtual communities have emerged as popular forums to engage in social networking. Social networks are now supported by web-based systems and software applications for various devices, including computers, laptops, mobile phones, and tablets. The availability of such technology and solutions enable users to easily connect and communicate with friends, relatives, colleagues, business contacts, and other users.

Users of social network systems and services who do not have a direct relationship with other users may nevertheless be linked to one another through intermediate entities. Such links or connections may be made based on personal, business, or other relationships between the users and the intermediate entities. For example, a user A may be linked to a friend, user B, who uses the same social network system or service as user A. User B may have a business relationship and connection with user C, who also uses the same social network system or service. As a result of these relationships, user A may be linked to user C through user B.

Social networks and relationships between users may be tracked and maintained by a social network system or service. For this purpose, users may register with a social network system or service, create a profile, and maintain a contact list or address book. A social network system or service may generate one or more graphs by observing which users communicate with one another and the direct or indirect links that exist between such users. Such social graphs may be represented by data that is organized and stored in a database or other storage medium.

SUMMARY

Embodiments of the present disclosure relate to computerized systems and methods for providing a meta-social graph. The meta-social graph may comprise a social graph with enriched data about the nodes (i.e., users) and links or connections in the social graph. Embodiments of the present disclosure also encompass systems and methods for utilizing a meta-social graph to provide, for example, promotional content to users.

In accordance with certain embodiments, a computerized method is provided for providing a meta-social graph. The method may include a plurality operations performed by at least one processor, including collecting a plurality of different online identities of a first user, each of said different online identities corresponding to a unique social network system. The method also includes collecting a plurality of communication data associated with the first user and determining bi-directional connections of the first user from the collected communication data. Further, the method includes creating a meta-social graph from the determined bi-directional connections and the plurality of different online identities of the first user, and generating a global identifier for the first user. The method may include storing, in at least one memory device, the meta-social graph with at least one of the generated global identifier, determined bi-directional connections, and collected communication data.

In accordance with additional embodiments of the present disclosure, a system is provided for building a meta-social graph. The system may comprise at least one processor and a memory device that stores instructions which, when executed by the at least one processor, causes the at least one processor to perform a plurality of operations, including collecting a plurality of different online identities of a first user, each of said different online identities corresponding to a unique social network system. The operations performed by the at least processor also include collecting a plurality of communication data associated with the plurality of different online identities of the first user and determining bi-directional connections of the first user from the collected communication data. Further, the operations performed by the at least one processor include creating a meta-social graph from the determined bi-directional connections and the plurality of different online identities of the first user, and generating a global identifier for the first user. The operations performed by the at least one processor also include storing, in at least one memory device, the meta-social graph with at least one of the generated global identifier, determined bi-directional connections, and collected communication data.

In accordance with further embodiments of the present disclosure, a computerized method is provided for providing promotional content to a first user. The method may include identifying the first user, the identification being determined by retrieving a meta-social graph and retrieving a first user profile from the retrieved meta-social graph. The method also includes identifying a plurality of features from the first user profile to be promoted to the first user and identifying a plurality of influencers from the first user profile with the highest influencer score corresponding to the plurality of features to be promoted to the first user. In addition, the method includes generating the promotional content based on the identified plurality of features and the plurality of influencers and electronically presenting the generated promotional content to the first user.

It is to be understood that both the foregoing general description and the following detailed description are exemplary and explanatory only, and are not restrictive of embodiments consistent with the present disclosure. Further, the accompanying drawings, which are incorporated in and constitute a part of this specification, illustrate embodiments of the present disclosure and together with the description, serve to explain principles of the present disclosure.

BRIEF DESCRIPTION OF THE DRAWINGS

The accompanying drawings, which are incorporated in and constitute a part of this disclosure, illustrate several embodiments and aspects of the present disclosure, and together with the description, serve to explain the principles of the presently disclosed embodiments. In the drawings.

DETAILED DESCRIPTION OF THE EMBODIMENTS

Reference will now be made in detail to exemplary embodiments, examples of which are illustrated in the accompanying drawings. Wherever possible, the same reference numbers will be used throughout the drawings to refer to the same or like parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the subject matter described.

Generally the terms, "member," "user," and "entity" are used interchangeably throughout this description. These terms, however, should not be seen as limited to a person. As used herein, a "user" may be an individual (human user), an entity (e.g., an enterprise, business, or third party application), or a group (e.g., of individuals or entities) that interacts or communicates with or over such a social network environment. Consequently, these terms should be seen as encompassing any entity, actual, legal, virtual, or otherwise, that uses a social network system.

Generally, the term "meta-social graph" refers to a social graph with enriched data about the nodes (i.e., users) and links or connections in the social graph. In addition to providing information about relationships between users, a meta-social graph may include data about a plurality of identities of a user, a global identifier for that user across multiple social networks, the strength of connections between that user and other users, communication data, and influencers for promotional content. The users represented in a meta-social graph may be members of a plurality of different social networks and have unique identities with respect to each such network.

Generally, the terms "social network," "social networking system," and "social networking service" are used interchangeably throughout this description. A social networking system, such as a social networking website or service (e.g., AIM™, Ask.fm™, Facebook™, LinkedIn™, MySpace™, Pinterest™, Twitter™, etc.) enables its users to interact with it, and with each other, through the system. Typically, to become a registered user of a social networking system, an entity, such as a person or company, registers for an account with the social networking system. Thereafter, the registered user may log onto the social networking system via an account by providing, for example, a correct ID or username and password.

Consistent with the present disclosure, when a user first registers for an account with a social networking system, the social networking system may create and store a record, such as a user or member profile, in connection with the user. The user profile may include information provided by the user and information gathered by various systems, including the social networking system. For example, the user may provide his or her name, contact information, birth date, gender, marital status, family status, employment, education background, preferences, interests, and other demographical information to be included in the user profile. The user may identify other users of the social networking system that the user considers friends or contacts. A list of the user's friends or first degree contacts may be included in the user profile and/or organized in a contact list or address book.

Connections in social networking systems may be bi-directional (i.e., existing in both directions) or unidirectional (i.e., existing in just one direction). For example, if John and Dave are both users and connect with each another, John and Dave have a bi-directional connection with each other. If, on the other hand, John wishes to connect to Sue to view Sue's posted content items, but Sue does not choose to connect to John, a unidirectional connection may be formed where Sue is John's connection, but John is not Sue's connection.

With many social network services, members are prompted to provide a variety of personal information, which may be displayed in a member's personal web page. Such information may be stored as that user's "personal profile information" or "profile information." It may be shown collectively and referred to as a member's profile. For example, personal information may be requested and displayed as part of a member's profile, including a member's age (e.g., birth date), gender, contact information, hometown, address, family members, a photograph of the member, interests, and so forth. With certain social network services, such as some business network services, a member's personal information may include information commonly included in a professional resume or curriculum vitae, such as information about a person's education, employment history, job skills, professional organizations, and so forth. With some social network services, a member's profile may be viewable to the public by default, or alternatively, the member may specify that only some portion of the profile is to be public by default. In either case, such social network service may serve as a directory of people to be searched and browsed.

Because social network services are a rich source of information about people, social network services are an extremely useful tool when performing certain tasks. Each social network tends to have a particular focus, for example, professional, photos, location, communication, etc. From publically available information of a user profile or from the shared information of the user and the knowledge of the social network system focus, embodiments of the present disclosure can learn who the user's influencers are in a particular area. Communication data may include, but is not limited to, the above types of information.

Figure 1:
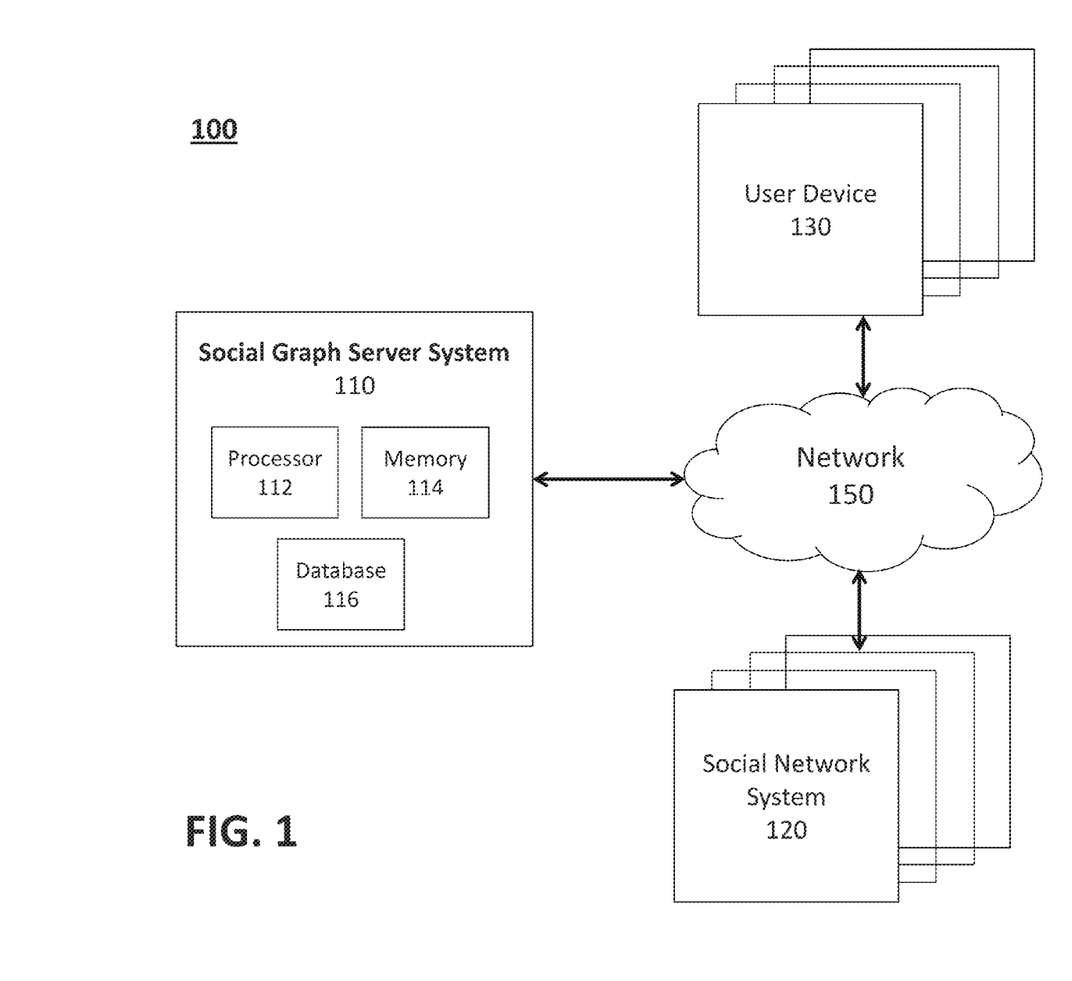
FIG. 1 depicts a block diagram of an exemplary system environment in which embodiments consistent with the present disclosure may be practiced and implemented.

FIG. 1 illustrates an exemplary system environment 100 in which embodiments consistent with the present disclosure may be practiced and implemented. As further disclosed herein, environment 100 of FIG. 1 may be used for building a meta-social graph and providing promotional content based on information from a meta-social graph to a user or advertiser, including online and mobile end-users. As will be appreciated, the number and arrangement of components illustrated in FIG. 1 is for purposes of illustration. Other arrangements and combinations of components may be utilized for implementing the embodiments and features disclosed herein.

As shown in FIG. 1, system environment 100 may include one or more social graph server systems 110, social network systems 120, and user devices 130. All of these components of system environment 100 may be disposed for communication with one another via an electronic network 150, which may comprise any form or combination for supporting digital data communication. Examples of electronic network 150 include a local area network (LAN), a wireless LAN (e.g., a "WiFi" network), a wireless Metropolitan Area Network (MAN) that connects multiple wireless LANs, a wide area network (WAN) (e.g., the Internet), and a dial-up connection (e.g., using a V.90 protocol or a V.92 protocol). In the embodiments described herein, the Internet may include any publicly-accessible network or networks interconnected via one or more communication protocols, including, but not limited to, hypertext transfer protocol (HTTP) and transmission control protocol/internet protocol (TCP/IP). Moreover, electronic network 150 may also include one or more mobile device networks, such as a 4G network, LTE network, GSM network or a PCS network, that allow a user device, to send and receive data via applicable communications protocols, including those described above.

As will be described in more detail below, in certain embodiments, social graph server system 110 may be configured to send and receive application programming interface (API) requests to and from social network system(s) 120 for collecting communication data, for purposes of providing a meta-social graph and promotional content. An "open graph" may enable social graph server system 110 to communicate with each social network system 120 via an application programming interface (API). Such an API may comprise an interface that supports requests from a software application. Further, the API may be specified in terms of a programming language that can be interpretative or compiled when an application is built, rather than an explicit low-level description of how data is laid out in memory. The software that provides the functionality described by an API is an implementation of the API. An example of such an "open graph" solution is the Graph API that supports FQL queries for Facebook™.

The exemplary system environment 100 of FIG. 1 may include one or more server systems, databases, and/or computing systems configured to receive information from entities in a network, process the information, and communicate the information with other entities in the network. In certain embodiments, the system 100 of FIG. 1 may be configured to receive data over an electronic network, such as the Internet, process/analyze the content, and provide the content to one or more applications. For example, in one embodiment, the system 100 of FIG. 1 may operate and/or interact with one or more host servers, one or more user devices, and/or one or more repositories, for the purpose of associating all data elements and integrating them into, for example, content and advertising systems.

Further, although system environment 100 is illustrated in FIG. 1 with a plurality of user devices 130 in communication with social graph server system 110 via network 150, persons of ordinary skill in the art will recognize that environment 100 may include any number of number of mobile or stationary user devices, and any additional number of computers, systems, or servers without departing from the spirit or scope of the disclosed embodiments. Further, although computing environment 100 is illustrated in FIG. 1 with a single social graph server system 110 and a plurality of social network systems 120, persons of ordinary skill in the art will recognize that environment 100 may include any number and combination of social graph servers and social network systems, as well as any number of additional components including data repositories, computers, systems, servers, and server farms, without departing from the spirit or scope of the disclosed embodiments.

The various components of the system of FIG. 1 may include an assembly of hardware, software, and/or firmware, including memory, a central processing unit ("CPU"), and/or a user interface. For example, with respect to social graph server system 110, memory 114 may include any type of RAM or ROM embodied in a physical storage medium, such as magnetic storage including floppy disk, hard disk, or magnetic tape; semiconductor storage such as solid state disk ("SSD") or flash memory; optical disc storage; or magneto-optical disc storage. A CPU of social graph server system 110 may include one or more processors 112 for processing data according to a set of programmable instructions or software stored in memory. The functions of each processor may be provided by a single dedicated processor or by a plurality of processors. Moreover, processors may include any type or combination of input/output devices, such as a display monitor, keyboard, touch screen, and/or mouse. Furthermore, social graph server system 110 may be implemented using one or more technologies such as JAVA, Apache/Tomcat, Bus Architecture (RabbitMQ), MonoDB, SOLR, GridFS, Jepetto, etc.

As further shown in FIG. 1, one or more databases ("data repositories") 116 may be provided that store data collected about each user, including the user's social networks, and/or the meta-social graph. Database 116 may be part of social graph server system 110 and/or provided separately within system environment 100. Social graph server system 110 and/or system environment 100 may also include a data store for storing the software and/or instructions to be executed by one or more processors (not illustrated in FIG. 1).

Social graph server system 110 may be a computing device that provides information to one or more other components of computing environment 100. In one embodiment, social graph server system 110 may include a general purpose computer (e.g., a personal computer, network computer, server, or mainframe computer) having one or more processors that may be selectively activated or reconfigured by a computer program. In one aspect, social graph server system 110 may be configured to provide one or more websites associated with an advertiser and/or content provider network. Further, upon request from a user device (e.g., user device 130), social graph server system 110 may be configured to provide information associated with a requested web page over communications network 150 to user device 130, which may render the received information and present the web page to a user. Social graph server system 110 may be incorporated as a corresponding node in a distributed network and, additionally or alternatively, as a corresponding networked server in a cloud-computing environment. Furthermore, social graph server system 110 may communicate via network 150 with one or more additional servers (not shown in FIG. 1), which may facilitate the distribution of processes for parallel execution by the additional servers.

The system environment 100 of FIG. 1, and/or the components thereof, may also include any combination of email software, instant messaging software, document management software, web hosting software, and/or any other software or set of instructions. Such software and/or set of instructions may implement or support any number of the processes, features, and interfaces disclosed herein. In another embodiment, the software may include a set of instructions executable by a processor to provide the methods, features, and interfaces described herein.

Figure 2:
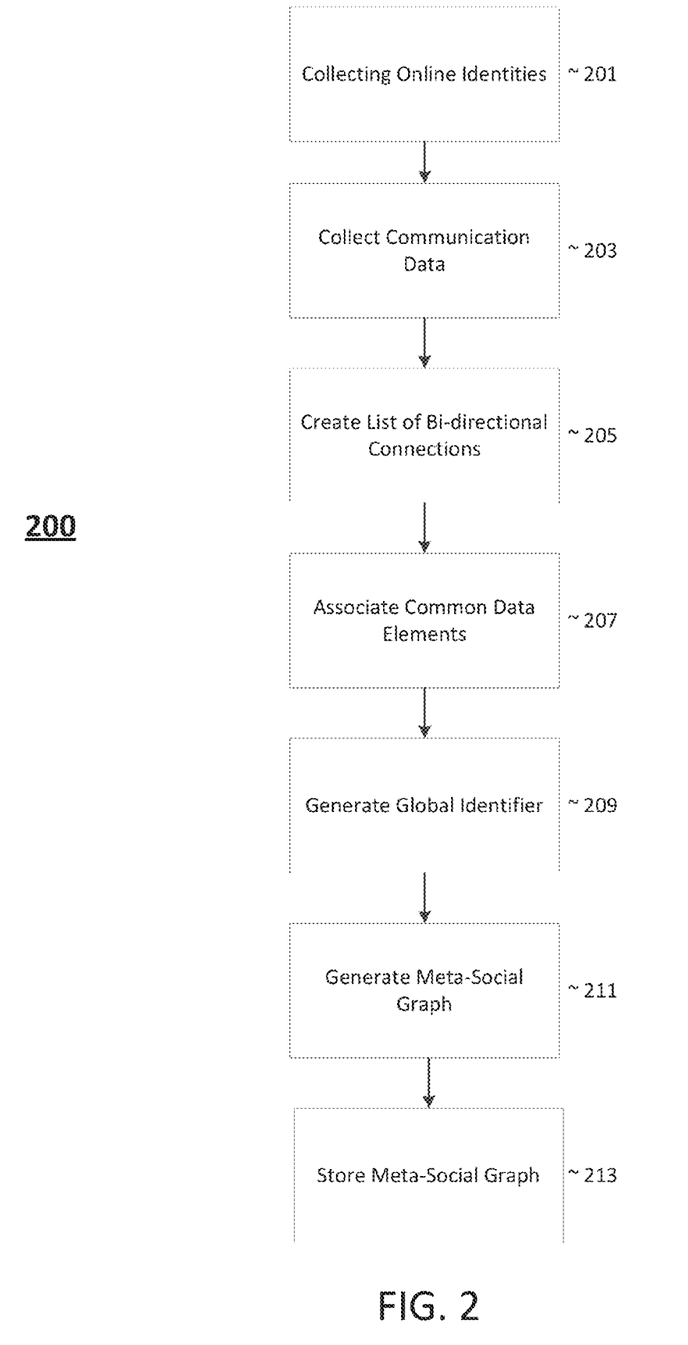
FIG. 2 depicts a flowchart of an exemplary method for building a meta-social graph, consistent with embodiments of the present disclosure.
Figure 3:
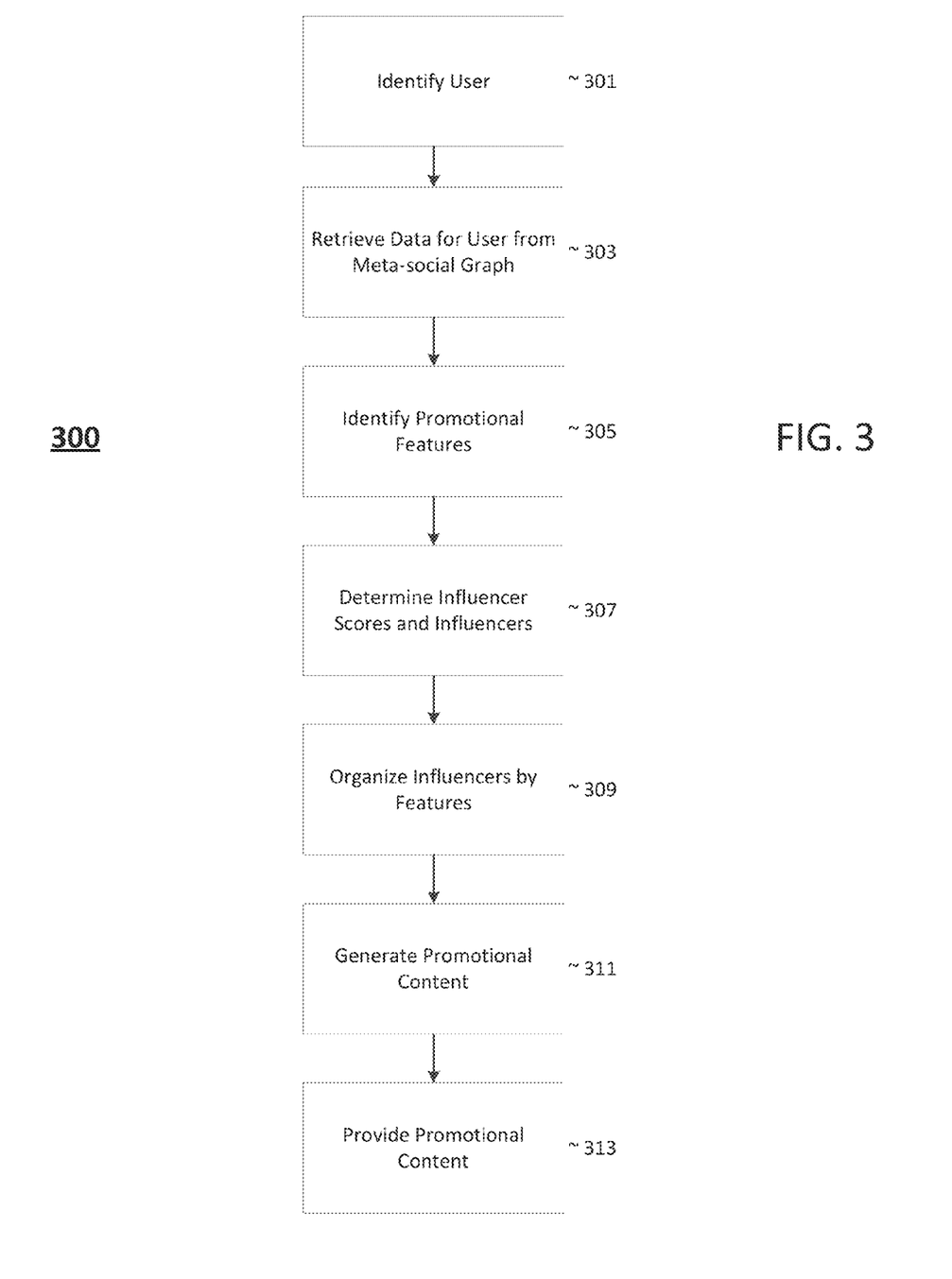
FIG. 3 depicts a flowchart of an exemplary method for providing promotional content using a meta-social graph, consistent with embodiments of the present disclosure.
Figure 4:
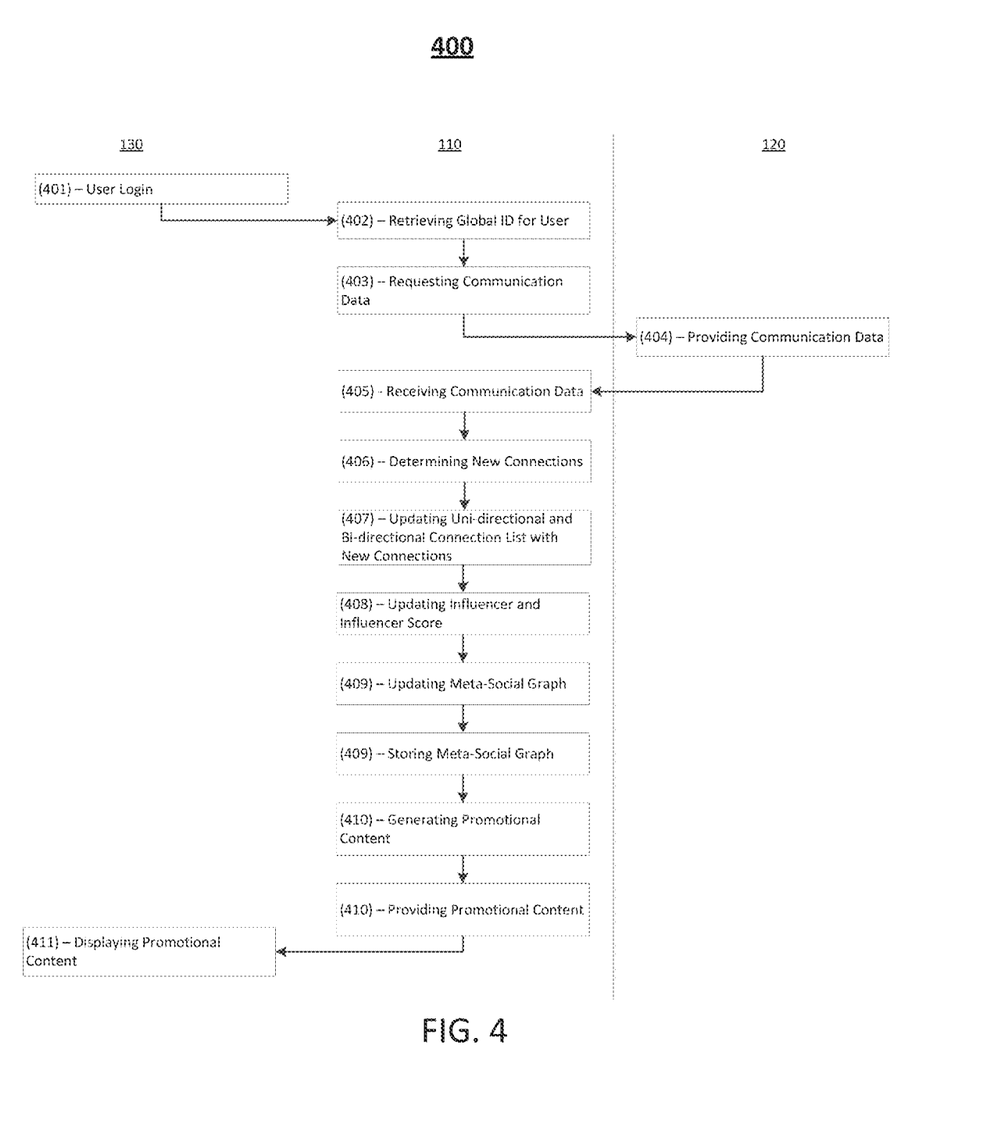
FIG. 4 depicts a flowchart of an exemplary process for updating user profiles in a meta-social graph, consistent with embodiments of the present disclosure.

The above system, components, and software associated with FIG. 1 may be used to implement various methods and processes consistent with the present disclosure, such as the exemplary processes and features illustrated in FIGS. 2-4.

FIG. 2 illustrates a flowchart of an exemplary process for building a meta-social graph 200, consistent with certain disclosed embodiments. In one embodiment, social graph server system 110 may collect online identities (step 201). Online identities may include any combination of alphanumeric characters, special symbols, photos, and/or biometrics identifiers of the user for one or more social networks. In one embodiment, online identities may include user names corresponding to a plurality of social networks 120. The collection of online identities may be shared with or communicated to the social graph server system 110. In another embodiment, social graph server system 110 utilizes a provided API of the social network(s) 120 to gather a user's online identity. For example, John logins into AOL with his Facebook™ user name.

Social graph server system 110 may collect publicly available communication data of the user from social network systems 120 (step 203). In one embodiment, social graph server system 110 may collect communication data utilizing the online identities of the user collected as part of step 201. Each online identity of the user may be used to identify and gather relevant communication data. For example, social graph server system 110 collects John's friends from his AIM™ buddy list. In another example, social graph server system 110 may query a provided API to gather the relevant communication data. In still another example, such relevant data may be identified by collecting the number of times the user was tagged in a photo with another user and/or identifying frequent and/or favorite locations visited by the user or friends of the user.

In step 205, social graph server system 110 may create a list of bi-directional connections between a plurality of users. A bi-directional connection may exist where there is at least one bi-directional connection between the first user profile and a plurality of other users. In one embodiment, the bi-directional connections may be identified from the collected communication data (step 203). For example, John is friends with Dave on Facebook™ and the connection between John and Dave on Facebook™ is bi-directional. In another embodiment, social graph server system 110 derives the bi-directional connections between a plurality of users utilizing the collected communication data (step 203). For example, Sue is in John's Twitter™ graph and John is in Sue's Twitter™ graph. Therefore, a bi-directional connection between John and Sue exists, In another embodiment, social graph server system 110 identifies and creates bi-directional connections based on available data and identified relationships. For example, assume John has a bi-directional connection with Ashley and Ashley has a bi-directional connection with Judson. While John is in Judson's graph, Judson is not in John's graph. The social graph server system 110 may analyze the communication data from John, Ashley, and Judson across different social network systems 120 to determine that Judson is bi-directionally connected to Ashley and has a single direction connection to John and, therefore, deduce that John and Judson have a bi-directional connection.

The created bi-directional connection list may be stored by social graph server system 110 in memory 114 and/or a database 116. In one embodiment, the bi-directional connection list may be created in near real-time as the communication data is received and/or analyzed.

In a further embodiment, social graph sever system 110 may use the collected data of steps 201 and 203 and associate common data elements. Social graph server 110 may correlate the common data elements across a plurality of social networks to combine, for example, a first user's Facebook™ profile with the same first user's Twitter™ profile, where the first user only shared one of his or her online identities. Data elements include, but not limited to, first and/or last name, location, occupation, work, employment, high school, college, e-mail address, same friends, etc. With this data, social graph server system 110 may identify people rather than only their online persona within social network(s) 120.

In step 209, social graph server system 110 may generate a global identifier for the first user. The global identifier may be unique to the first user and encompass the first user's plurality of online identities. The global identifier may consist of, but not limited to, any combination of alphanumeric characters, symbols, biometrics properties, or photos. For example, John could be assigned a global identifier of "wd12". In such a case, the global identifier of "wd12" for John may encompass, for example, John's AOL™, Facebook™ and Twitter™ accounts. In an embodiment, the global identifier may not need to be the same as the online identifier for any specific social network. For example, Ashley global identifier is "2345" and this identifier does not correspond to an AOL™ profile.

In another embodiment, social graph server system 110 may dynamically build a meta-social graph for a first user based on existing social graphs. The social graph server system 110 may build the meta-social graph from connections between multiple users' social graphs to determine relationships between social networks, products, and/or users. Social graph server system 110 may construct a meta-social graph across different categories or focuses of social networks, such as professional networks (e.g., LinkedIn™), photo-sharing networks (e.g., Flickr™), location-sharing networks (e.g., FourSquare™), or communication networks (e.g., Facebook™). From each social network 120, social graph server system 110 may learn information about the user, from public information or additional information that can be collected based on user consent, such as name, educational experience, work experience, date of birth, hometown, publications, speaking engagements, handle, etc. In addition, social graph server system 110 may learn information about the primary user and other users, such as the transaction rate between two people (e.g., comments, likes, favorites, mentions, etc.).

Social graph server system 110 may use the data to build a meta-social graph that identifies people, in addition to digital personas, within a social network. For example, a user "Alice" may be connected to two other users, "Bob" and "Mallory," via Facebook™ and also connected to Bob via Flickr™. Alice may know that Bob has both a Facebook™ and Flickr™ identity, and that Mallory has a Facebook™ identity, but may not know that Mallory has another identity in a different social network (e.g., Flickr™) In turn, a fourth user, "Eve," may be connected to Mallory on both Facebook™ and Flickr™. Social graph server system 110 may determine that the Mallory "persona" that Eve is connected to in Flickr™ represents the same user that Alice is connected to on Facebook™. Social graph server system 110 may combine both of the Mallory digital "personas" into a single digital "person," even if Bob and Eve are not connected.

Social graph server system 110 may track activities of users via their personas or online identities across multiple social networks. As a result, social graph server system 110 may determine the closest, or most engaged, people in an online environment. Using the data gathered on a user, social graph server system 110 may determine a higher quality or "trusted" influence for promotional content based on a user's most closely associated individuals or highest influence scores. Social graph server system 110 may store the meta-social graph created in step 211 in a database 116. For example, the meta-social graph may be represented as a table in a database 116. In another embodiment, the social graph server system 110 may store, in whole or part, the meta-social graph in memory 114.

FIG. 3 illustrates a flowchart of an exemplary process 300 for providing promotional content using a meta-social graph. As shown in FIG. 3, the social graph server system 110 may identify the user by retrieving the user's profile from the meta-social graph (step 301). Additionally or alternatively, the user may be retrieved from the meta-social graph using the user's online identity, biometric identity, photo, and/or global identifier (step 303). For example, John logs into the social graph server system 110 using his LinkedIn™ username "john@linked.com" and the social graph server system 110 finds John by his global identifier "wd12". In another example, the social graph server system 110 finds John by his LinkedIn™ username "john@linked.com".

Social graph server system 110 may also be configured to identify, by at least one processor, a plurality of promotional features relevant to the user (step 305). Social graph server system 110 may group the features by subject in order to prevent unwanted or undesirable influencers on the features, such as ensuring that a user's close connection in "photography" does not influence promotional content on "computer security." In one embodiment, social graph server system 110 may use the meta-social graph to highlight products or services a user is most likely to purchase based on the information garnered from the user, the user's social networks, the user's activities on the social networks, and/or the user's most engaged connections. For example, social graph server system 110 may display product reviews and/or products liked by identified influencer(s) of the user. The identified influencer(s) may or may not be members of the user's meta-social graph. In addition, the identified influencer(s) may have a bi-directional, unidirectional, or no connection to the user. For example, influencer X may be ranked highly knowledgeable with respect to feature Y by friends or colleagues of the user and, therefore, social graph server system 110 may identify feature Y as relevant to the user and may display influencer X and feature Y to the user, even though there is no connection or only a unidirectional connection between the influencer X and the user. In another example, social graph server system 110 may display an advertisement to the user and display a group of influencers with the highest influencer score in proximity to the advertisement. Therefore, social graph server system 110 may provide more targeted advertising and product promotion.

In one embodiment, social graph server system 110 may determine and assign a sub-score to each influencer corresponding to a promotional feature (step 307). The social graph server system 110 may calculate or derive the influencer's score by combining the influencer's sub-scores corresponding with each promotional feature. In a further embodiment, the social graph server system 110 may apply a weighting factor for promotional features using the collected communication data. For example, an influencer may receive a higher influencer score based on having a higher transaction rate with the user (e.g. comments, likes, favorites, twitter mentions, etc.) In another example, an influencer may receive a higher influencer score for being tagged in more photos with the user or visiting a location often near the user's work or home.

In another embodiment, social graph server system 110 may determine influencers by features (step 309). Features may be areas of interest to a user. These areas of interest may include products, digital content, businesses, etc. In a further embodiment, determining influencers by features (step 309) may include retrieving areas of interest to the user, comparing those areas of interest with a plurality of influencers, organizing the plurality of influencers by features corresponding to those areas of interest, and/or combining the sub-category scores into a single influencer score. For example, social graph server system 110 may organize influencers into photography, automobile, music, gaming, and/or professional groups. As a result, influencers, for example, who liked, commented, and/or mentioned photography products more often than automobile products may be grouped and subsequently identified more easily. Social graph server 110 may use the number of likes, comments, and/or mentions from the influencer to determine the influencer score related to that feature. Social graph server system 110 may determine from the meta-social graph which users are not using the services provided by social graph server system 110, but who may be most likely to engage with the services in order to grow the network of users of social graph server system 110. In a further embodiment, the social graph server system 110 may track activities performed by members and match those activities with the user's social graph. Activities, for example, may include a user checking into FourSquare™, reposting an ad for a product, tagging friends and a location in a photo, following a business on multiple social networks, and/or sharing their social graphs with AOL™. From this, the social graph server system 110 may be further configured to determine which connections are strongest and have the highest influence on the user staying, for example, with AOL™. Further, the social graph server system 110 may determine a "trusted" or higher influence score by using techniques including, but not limited to, combining data layers, omniture, and behavior classification.

Social graph server system 110 may be configured to generate promotional content to a user (step 311). For example, social graph server system 110 may generate or identify several advertisements related to computer security, cars, photography, and/or music. For example, advertisements may be identified by feature and/or existing influencers with high scores in a particular area of interest to the user. In an embodiment, social graph server system 110 may further be configured to provide the promotional content to the user (step 313). Social graph server system 110 may display generated promotional content to the user device 130 via a display or screen of that device. In another embodiment, social graph server system 110 may display the promotional content on a web page visited by the user. In a further embodiment, social graph server system 110 may provide an advertisement from a third party (not shown). The third party may use an API provided by the social graph server system 110 to have its advertisement or other promotional content (e.g., sales offer, discount, enrollment opportunity, etc.) displayed to the user. Communication of the promotional content may also be achieved through the user's highest influencers corresponding to the promotional content. In one embodiment, social graph server system 110 may display the influencers profile with promotional content in various areas of the influencer's profile. By way of example, using an influencer with a high score in "automobiles," social graph server 110 may display automobile products or automobile product reviews to the user, along with the profile of the relevant influencer for that content.

FIG. 4 illustrates an exemplary process for updating a plurality of user profiles in a meta-social graph. In step 401, a user using user device 130 logs into social graph server system 110. In step 402, social sever system 110 may retrieve the global identifier for the user. Social server system 110 may request communication data from one or more social network systems 120 (step 403). Social network system(s) 120 may provide communication data in step 404 to social graph server 110 via an API. In another embodiment, social graph server system 110 collects the publically available communication data from social network system(s) 120.

In step 405, social graph server system 110 may receive the communication data. For example, social graph server 110 may receive a list of friends of the user, transaction data and rates between the user and a plurality of users (e.g. comments, likes, favorites, Twitter mentions, photo tags, location data, etc.). Social graph server 110 may determine, in step 406, the communication data contains new unidirectional and/or bi-directional connections of the user. In such cases, as part of step 407, social graph server system 110 may be configured to update the bi-directional connection list with the new deduce connections, in view of the new unidirectional and/or bi-directional links. For example, John followed Karen on Twitter™ and Karen followed John. Social graph server system 110 may be configured to update the influencers and their scores (step 408) as a result of the updated bi-directional connection list. In one embodiment, the influencer and their scores are updated periodically. In another embodiment, social graph server system 110 may update the influencer and their scores in near real-time. For example, as social graph server system 110 receives promotional content from a third-party, the social graph server system 110 may update influencers, their scores, and categories in near real-time to match the promotional feature.

In step 409, social graph server system 110 may update the meta-social graph and store the same in memory 114 (step 411). In another embodiment, social graph server system 110, may store the updated meta-social graph in a database 116 (step 411). Social graph server system 110 may generate promotional content to the user (step 410). In one embodiment, social graph server system 110 may generate promotional content with new influencers as a result of the updated meta-social graph. For example, John's new connection Karen may have the highest influencer score corresponding to photography. The social graph server system 110, for example, may update the generated promotional content to include photography and profile information for Karen.

Social graph server system 110 may provide the generated promotional content in step 410, to the user device 130. In one embodiment, the promotional content may be provided as part of an application or a plug-in. In another embodiment, the promotional content may be provided on or through a website. In a further embodiment, the promotional content may be provided to the user device 130 as an advertisement or offer. In yet a further embodiment, social graph server system 110 may provide the promotional content to the social network system(s) 120. In step 411, the provided promotional content may be displayed to the user on, for example, user device 130. For example, a video advertisement may be displayed on user device 130 showing a list of influencers following the promotional content.

Figure 5:
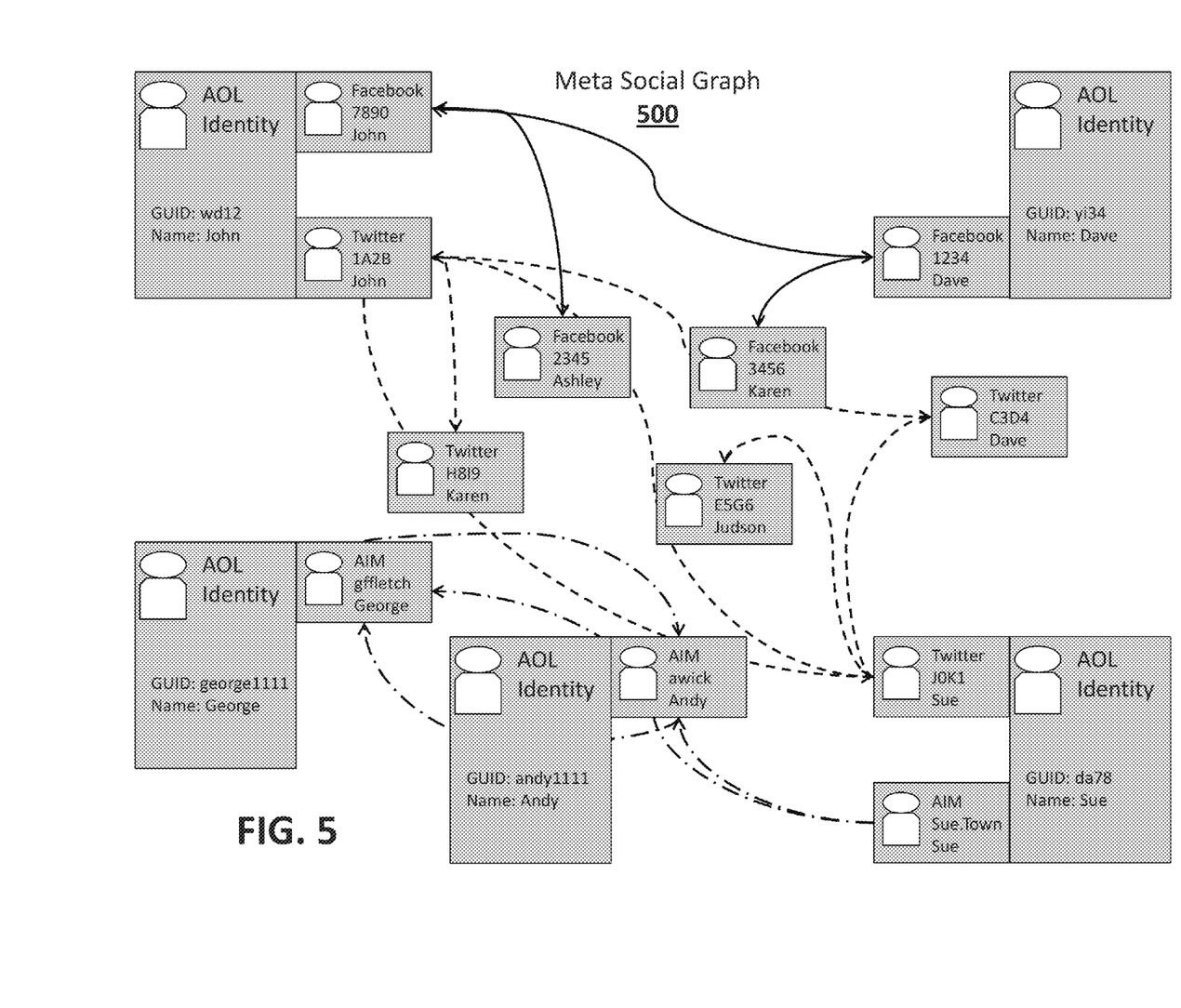
FIG. 5 depicts a block diagram of an exemplary system for building a meta-social graph, consistent with embodiments of the present disclosure.

FIG. 5 depicts an exemplary graphical representation of a meta-social graph showing the relationships between entities. FIG. 5 shows, for example, a solid line with arrows on both ends represents an existing bi-directional connection. For example, John (GUID: wd12) has a solid line connection or a bi-directional connection with Dave (GUID: yi34). A dotted line with a single arrow end identifies a user following another user on Twitter™ or a unidirectional connection. For example, John (GUID: wd12) follows Karen. The dash and dotted line with a single arrow end identifies users in each other's friend list or a bi-directional connection. For example, George (GUID: george1111) is a member of Andy's (GUID: andy1111) friend list on AIM™. The entities' online identities may have been shared with social graph server system 110. In another embodiment, the online identities are used to log into the social graph server system 110. FIG. 5 shows, for example, the AOL™ Identity 'John' with GUID 'wd12' has shared two social networks with social graph server system 110: Facebook™ and Twitter™. In John's Facebook™ graph, he is connected to Dave and Ashley. In John's Twitter™ graph, he is connected to Dave, Sue, and Karen. FIG. 5 further depicts, for example, Dave (GUID: yi34) has only shared his Facebook™ network with social graph server system 110 and is connected to both John and Karen. Sue uses social graph server system 110 (GUID: da78) and has shared two social networks with social graph server system 110: Twitter™ where she is connected to Dave, Judson and John, and AIM™ where she is connected to Andy and George.

Figure 6:
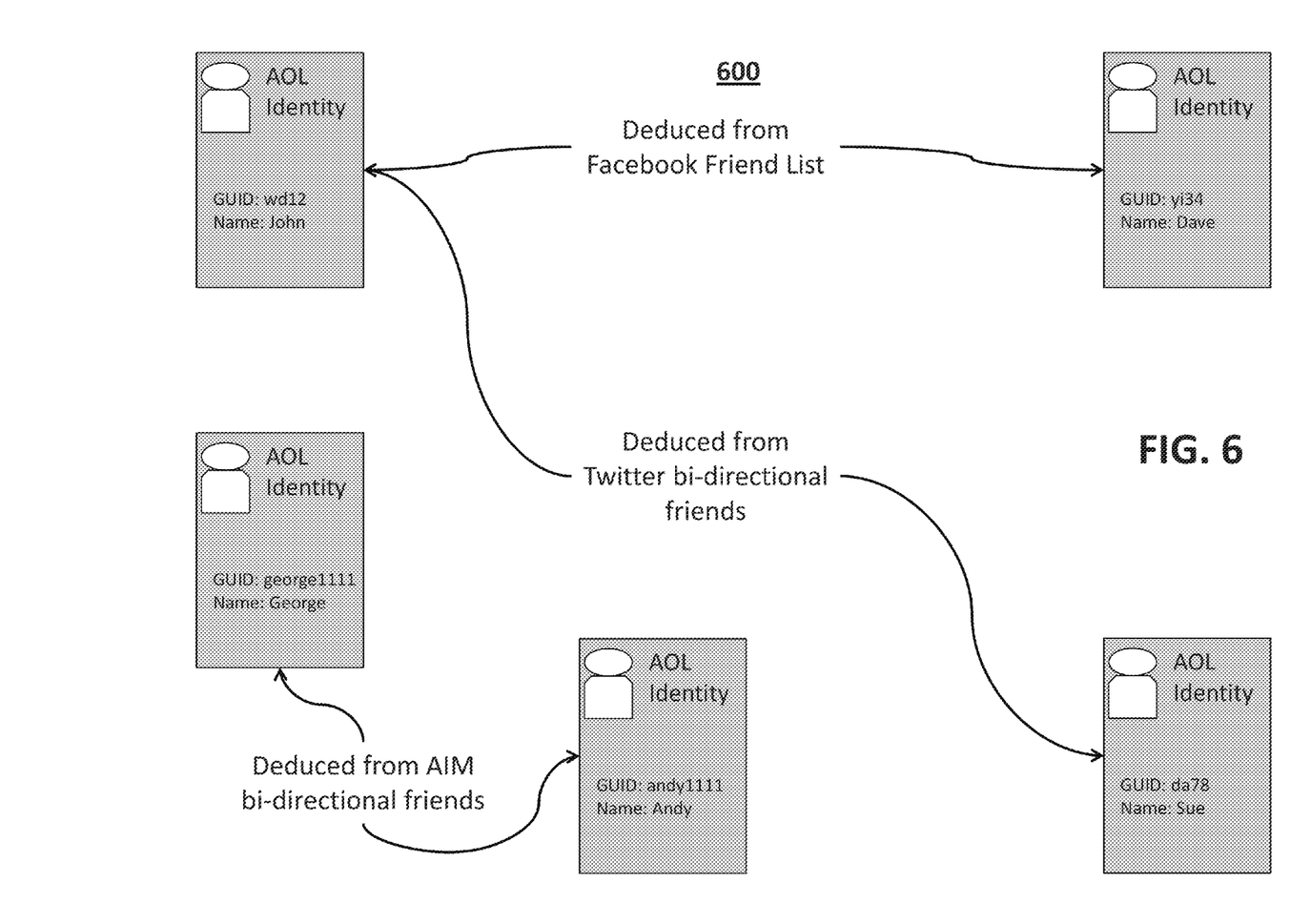
FIG. 6 depicts a block diagram of an exemplary system for building a connection list, consistent with embodiments of the present disclosure.

FIG. 6 depicts an exemplary connection list of a plurality of users. Based on the above-described exemplary meta-social graph depicted in FIG. 5, social graph server system 110 may deduce connections between the single digital person and the plurality of social network personas across social network systems 120. Using a rule, for example, that requires for social graph server system 110 profiles to be connected, there must be a bi-directional relationship. In another embodiment, the social graph server system 110 may construct the social graph using a variety of other rules.

As shown in FIG. 6, social graph server system 110 may deduce from the meta-social graph depicted in FIG. 5 that John is connected to Dave by virtue of their bidirectional Facebook™ relationship, John is connected to Sue because Sue is in John's Twitter™ graph and John is in Sue's Twitter™ graph.

Figure 7:
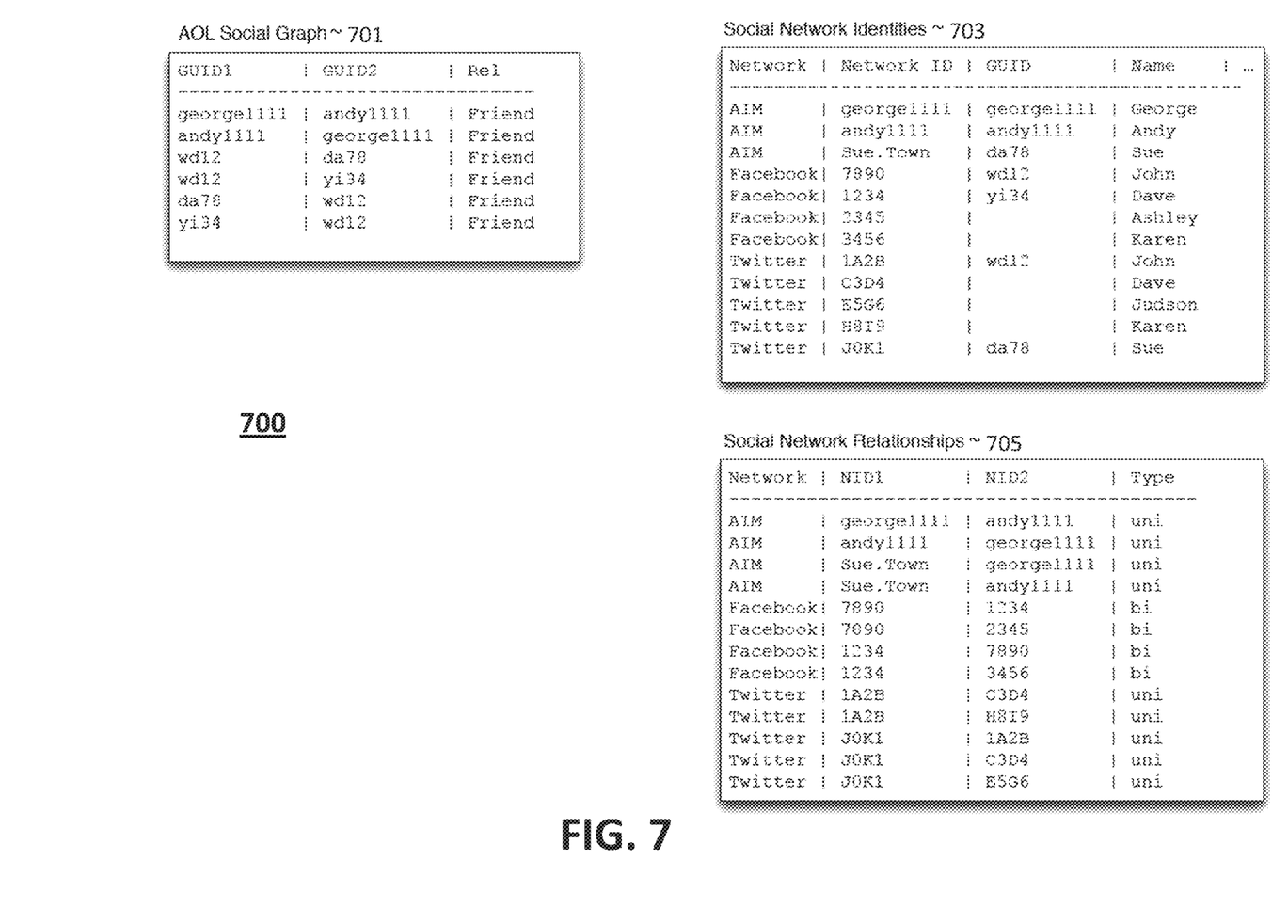
FIG. 7 depicts a flowchart of an exemplary system for storing a meta-social graph, consistent with embodiments of the present disclosure.

FIG. 7 depicts an exemplary system for storing a meta-social graph. FIG. 7 shows, for example, three tables, AOL Social Graph 701, Social Networking Identities 703, and Social Network Relationships 705, respectively, representing the meta-social graph stored on social graph server system 110. Further, depicted is an exemplary graphical representation of the deduced relationships of the entities. In one embodiment, the Social Network Identities 703 table displays, for example, a representation of each friend in each network's social graph allowing the social graph server system 110 to be configured to store the data about a friend once. In one embodiment, Social Network Relationship table 705 may store relationships between friends within a given social network 120. In another embodiment, social graph server system 110 may query the Social Network Relationship table 705 by social network 120 and social network profile, for example, NID1. In a further embodiment, social graph server system 110 may be configured to perform a new execution to update tables Social Graph 701, Social Network Identities 703, and Social Network Relationships 705 if there is any new social graph connections that can be established when a new user logs in using a social graph provider (e.g. Facebook™, Twitter™) or shares one of their plurality of social graphs with the social graph server system 110.

The foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. For example, systems and methods consistent with the disclosed embodiments may be implemented as a combination of hardware and software or in hardware alone. Examples of hardware include computing or processing systems, including personal computers, laptops, mainframes, micro-processors and the like. Additionally, although aspects are described for being stored in memory, one skilled in the art will appreciate that these aspects can also be stored on other types of computer-readable media, such as secondary storage devices, for example, hard disks, floppy disks, or CD-ROM, or other forms of RAM or ROM.

Programmable instructions, including computer programs, based on the written description and disclosed embodiments are within the skill of an experienced developer. The various programs or program modules may be created using any of the techniques known to one skilled in the art or may be designed in connection with existing software. For example, program sections or program modules may be designed in or by means of C#, Java, C++, HTML, XML, CSS, JavaScript, or HTML with included Java applets. One or more of such software sections or modules may be integrated into a computer system or browser software or application.

In some embodiments disclosed herein, some, none, or all of the logic for the above-described techniques may be implemented as a computer program or application or as a plug-in module or subcomponent of another application. The described techniques may be varied and are not limited to the examples or descriptions provided. In some embodiments, applications may be developed for download to mobile communications and computing devices (e.g., laptops, mobile computers, tablet computers, smart phones, etc.) and made available for download by the user either directly from the device or through a website.

The foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

It is intended, therefore, that the specification and examples be considered as exemplary only. Additional embodiments are within the purview of the present disclosure and sample claims.

What is claimed is:

1. A computer-implemented method for providing a meta-social graph, the method comprising the following operations performed by at least one processor:

collecting a plurality of different online identities of a first user, each of said different online identities corresponding to a unique social network system;

collecting a plurality of communication data associated with the first user;

determining bi-directional connections of the first user with other users from the collected communication data;

creating a meta-social graph from the determined bi-directional connections and the plurality of different online identities;

generating a global identifier for the first user;

storing, in at least one memory device, the meta-social graph with at least one of the generated global identifier, the determined bi-directional connections, and the collected communication data;

retrieving a set of profile features derived from data in a meta-social graph profile or retrieved from a data source external to the meta-social graph;

determining influencer scores for each of a plurality of different users, the influencer score for each of the plurality of different users indicating a measure of influencing ability with respect to the first user;

associating the plurality of different scored users with at least one profile feature based on the retrieved profile features; and generating promotional content for the first user based on profile features from the first user and a plurality of identified influencers with corresponding associated profile features and the highest influencing scores with respect to the first user, wherein determining influencer scores for each said different user comprises:

comparing each profile feature in the set of profile features with a corresponding profile feature from a first user profile to determine an influencer sub-score for each profile feature in the set; and combining the influence sub-scores corresponding with each profile feature in the set of profile features to compute the influencer score.

2. The computer-implemented method of claim 1, wherein communication data includes at least one of contacts, tags, and location data.

3. The computer-implemented method of claim 1, wherein the meta-social graph includes the determined bi-directional connections of the first user and the collected communication data.

4. The computer-implemented method of claim 1, wherein the global identifier is unique and differs from the plurality of different online identities.

5. The computer-implemented method of claim 1, wherein a plurality of influencers' profile includes a weighting factor for certain profile features, which, when applied during a calculation to combine the sub-scores, affects the weight that a respective profile feature has in contributing to an overall influencer score.

6. The computer-implemented method of claim 5, wherein the weighting factor for certain profile features comprise at least one of a:
   geo-location;
   career;
   photos shared by the plurality of influencers;
   ratings by the plurality of influencers;
   plurality of features used by the plurality of influencers; and
   transaction rates between the plurality of influencers and a plurality of entities.

7. The computer-implemented method of claim 1, further comprising:
   combining the plurality of different online identities under the global identifier of the first user, the combining determined by:
     retrieving the list of bi-directional connections;
     determining number of bi-directional connections for the first user;
     associating common data elements across the plurality of said different first user online identities with the first user and the number of bi-directional connections; and
   storing, in at least one memory device, the combined plurality of different online identities under the unique global identifier of the first user.

8. The computer-implemented method of claim 1, further comprising displaying at least one influencer corresponding to at least one feature to be promoted to the first user.

9. A system for providing a meta-social graph, the system comprising:
   at least one processor;
   a memory device that stores a set of instructions which, when executed by the at least one processor, causes the at least one processor to:
     collect a plurality of different online identities of a first user, each of said different online identities corresponding to a unique social network system;
     collect a plurality of communication data associated with the first user;
     determine bi-directional connections of the first user with other users from the collected communication data;
     create a meta-social graph from the determined bi-directional connections and the plurality of different online identities;
     generate a global identifier for the first user;
     store, in at least one memory device, the meta-social graph with at least one of the generated global identifier, the determined bi-directional connections, and the collected communication data;
     retrieve a set of profile features derived from data in a meta-social graph profile or retrieved from a data source external to the meta-social graph;
     determine influencer scores for each of a plurality of different users, the influencer score for each of the plurality of different users indicating a measure of influencing ability with respect to the first user;
     associate the plurality of different scored users with at least one profile feature based on the retrieved profile features; and
     generate promotional content for the first user based on profile features from the first user and a plurality of identified influencers with corresponding associated profile features and the highest influencing scores with respect to the first user,
     wherein to determine influencer scores for each said different user, the processor is configured to:
       compare each profile feature in the set of profile, features with a corresponding profile feature from a first user profile to determine an influencer sub-score for each profile feature in the set; and
       combine the influencer sub-scores corresponding with each profile feature in the set of profile features to compute the influencer score.

10. The system in claim 9, wherein communication data includes at least one of contacts, tags, and location data.

11. The system in claim 9, wherein the meta-social graph includes the determined bi-directional connections of the first user and the collected communication data.

12. The system in claim 9, wherein the global identifier is unique and differs from the plurality of different online identities.

13. The system in claim 9, wherein a plurality of influencers' profile includes a weighting factor for certain profile features, which, when applied during a calculation to combine the sub-scores, affects the weight that a respective profile feature has in contributing to an overall influencer score.

14. The system in claim 13, wherein the weighting factor for certain profile features comprise at least one of a:
   geo-location;
   career;
   photos shared by the plurality of influencers;
   ratings by the plurality of influencers;
   plurality of features used by the plurality of influencers; and
   transaction rates between the plurality of influencers and a plurality of entities.

15. The system in claim 9, further comprising instructions which, when executed by the processor, cause the processor to:
   combine the plurality of different online identities under the global identifier of the first user, the combining determined by:
     retrieving the list of bi-directional connections;
     determining a number of bi-directional connections for the first user;
     associating common data elements across the plurality of different online identities with the first user and the number of bi-directional connections; and
   store the combined plurality of different online identities under the unique global identifier of the first user.

16. The system in claim 9, further comprising instructions which, when executed by the processor, cause the processor to:
   display at least one influencer corresponding to at least one feature to be promoted to the first user.

17. A computer-implemented method for providing promotional content, the method comprising:

identifying a first user, the identification being determined by:
  retrieving, by at least one processor, a meta-social graph comprising a global identifier associated with the first user and identifiers of other users having bi-directional connections with the first user;
  retrieving, by at least one processor, a first user profile from the retrieved meta-social graph using the global identifier associated with the first user;
identifying, by at least one processor, a plurality of features from the first user profile to be promoted to the first user;
identifying, by at least one processor, a plurality of influencers among the other users ;
combining the plurality of influencers into sub-categories, the sub-categories determined by:
  determining the influencer score of each influencer for a plurality of features: and
  combining the influencers the highest influencer score into sub-categories corresponding to the plurality of features;
associating, by the at least one processor, the identified influencers with at least one feature derived from data in the meta-social graph or a data source external to the meta social graph;
generating, by at least one processor, the promotional content corresponding to the identified plurality of features from the first user and the plurality of influencers with corresponding associated features and the highest influencer scores; and
displaying, to the first user, the generated promotional content for the plurality of features and the corresponding combined plurality of influencers.

18. The computer-implemented method of claim 17, further comprising displaying the plurality of influencers corresponding to the plurality of features to be promoted to the first user.

19. The computer-implemented method of claim 17, wherein the promotional content comprises at least one of an advertisement, an offer to join a social network, and an offer to stay a member of the social network.

20. The computer-implemented method of claim 17, further comprising:
  retrieving a first user location;
  retrieving the plurality of influencers corresponding to the first user location from the meta-social graph;
  generating promotional content corresponding to the first user location including the retrieved plurality of influencers; and
  displaying, to the first user, the generated promotional content.

21. The computer-implemented method of claim 17, further comprising:
  retrieving a plurality of influencers among the other users having a highest influencer score corresponding to the at least one identified feature of interest to the first user from the meta-social graph; and
  displaying, to the first user, promotional content including the retrieved plurality of influencers corresponding to the feature of interest.

* * * * *